Patented Apr. 1, 1952

2,591,493

UNITED STATES PATENT OFFICE 2,591,493

METAL MOLYBDITE CATALYZED DEHYDRATION PROCESS

Herrick R. Arnold, Wilmington, and James E. Carnahan, New Castle, Del., assignors to E. I. du Pont de Nemours & Company, Wilmington, Del., a corporation of Delaware No Drawing. Application February 9, 1950, Serial No. 143,351

13 Claims. (Cl. 260—465.2)

This invention relates to dehydration processes and more particularly to a novel catalytic dehydration process.

This application is a continuation-in-part of our copending application Serial No. 111,982, filed August 23, 1949, now Patent No. 2,572,300.

Organic compounds capable of undergoing dehydration reactions, such as alcohols, have heretofore been subjected to dehydration reactions in the presence of various anhydrous metal oxide catalysts. The anhydrous metal oxides constitute an important class of catalysts and are classified according to their effect on alcohols as dehydrogenating, dehydrating, or mixed dehydrogenating-dehydrating catalysts. Oxides of aluminum and of silicon have heretofore been used as catalysts in dehydration processes.

It is an object of this invention to provide a novel catalytic dehydration process. A further object is to provide an improved catalytic process for dehydrating organic compounds capable of undergoing dehydration. A still further object is to provide a catalytic dehydration process of broad applicability which employs a rugged and highly selective catalyst. Other objects will appear hereinafter.

This invention provides a dehydration process which comprises contacting an organic compound capable of undergoing dehydration with a molybdite of a metal whose ions are soluble in excess aqueous ammonia, that is whose ions are soluble in aqueous ammonia in amount greater than that stoichiometrically required to precipitate the metal ion. These catalysts are metal molybdites whose ions are not precipitated as insoluble oxides or hydroxides when solutions of their salts are treated with aqueous ammonia in amount slightly in excess of that which is theoretically required for the formation of the metal oxide or hydroxide. Accordingly this invention provides an improved dehydration process, the improvement residing in effecting the dehydration reaction in the presence of a metal molybdite whose ions are not precipitated as insoluble oxides or hydroxides when solutions of its salts are treated with aqueous ammonia in amount slightly in excess of that which is theoretically required for the formation of the metal oxide or hydroxide.

In practice, the dehydration is effected by contacting the material undergoing dehydration with the metal molybdite catalyst in a reactor heated to between 50° C. and 500° C., collecting the reaction product, and then isolating the desired product from the reaction mixture by precision fractional distillation or other means known to those skilled in the art.

The examples which follow illustrate specific preferred embodiments of the invention and are not to be construed as limitations thereof.

Example I

A heat-resistant glass reactor mounted in a vertical electric furnace was packed with 100 ml. of 8–14 mesh zinc molybdite catalyst, prepared as described subsequently. With the catalyst at 345° ± 3° C. and under atmospheric pressure, 100 g. (0.77 mol) of octanol-2 was vaporized and fed at constant rate into the reactor during a period of 4.9 hours, along with a stream of nitrogen flowing at the rate of 0.05 liter per minute. The calculated contact time was 26 seconds. Exit gases from the reactor were received and cooled in a series of condensers operating at decreasing temperatures to —80° C. and the uncondensible off-gases were vented through a meter. Fractional distillation of the condensate showed that the product was a mixture of octenes which had formed in 82% conversion. Infrared spectroanalysis indicated that 4% of the product was 1-octene, while the remainder consisted of the other isomeric linear octenes.

The catalyst was prepared as follows:

Five liters of a 2 molar aqueous solution of ammonium molybdate was added to an equal volume of a 2 molar aqueous solution of zinc nitrate and the pH of the resulting slurry adjusted to 7 by addition of 670 cc. of 28% aqueous ammonia. The precipitated zinc aminomolybdate ($ZnMoO_4 \cdot NH_3 \cdot H_2O$) was washed with distilled, water, filtered, dried and then calcined at 400° C. The calcination step converted the zinc aminomolybdate to the normal zinc molybdate $$(ZnMoO_4)$$

The normal zinc molybdate thus obtained was converted to zinc molybdite by reduction in hydrogen by stepwise temperature increments starting at 200° C. and carried to 550° C. during a total period of 27.5 hours of which time 21 hours were at 550° C. The reaction was as follows:

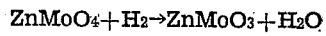
$$ZnMoO_4 + H_2 \rightarrow ZnMoO_3 + H_2O$$

The zinc molybdite was essentially insoluble in 10% hydrochloric acid and in 28% ammonia, whereas the zinc aminomolybdate and zinc molybdate were almost completely soluble in these solvents. The reaction of the zinc molybdate to zinc molybdite also produced a ten-fold increase in surface area as shown below:

|  | Spec. area, sq. m./gram[1] | Apparent density, grams/100 cc. |
|---|---|---|
| Zinc molybdate | 2.4 | 1.54 |
| Zinc molybdite | 22.6 | 1.50 |

[1] Measurements were made according to the procedure described in a paper by P. H. Emmett, entitled "A New Method for Measuring the Surface Areas of Finely Divided Materials and for Determining the Size of Particles," Am. Soc. for Testing Materials, March 4, 1941, Symposium on New Methods for Particle Size Determination in the Sub-Sieve Range.

X-ray diffraction analysis of the zinc molybdite indicated that this material had the characteristic system of lines corresponding to a single cubic structure. Analysis of the zinc molybdite indicated it to contain an average of 31.9% Zn and 44.8% molybdenum. The calculated values for $ZnMoO_3$ are 31.2% Zn and 45.4% Mo.

*Example II*

Example I was repeated using tert.-butanol as the reactant. The catalyst, 50 ml. in volume, was maintained at 310±10° C. under atmospheric pressure while 37 g. (0.5 mole) of tert.-butanol was vaporized at a constant rate during 1.7 hours and fed into the reactor through which nitrogen was flowing at the rate of 0.1 liter per minute. The calculated contact time was 7 seconds. Distillation of the exit gases which were collected in a receiver at −80° C. gave isobutylene in substantially quantitative conversion. When the temperature of the catalyst was reduced to 175±5° C., the corresponding conversion was 13%.

*Example III*

Example I was repeated using n-butanol as the reactant. The catalyst, 50 ml. in volume, was maintained at 300±10° C. under atmospheric pressure while 37 g. (0.5 mole) of n-butanol was vaporized at constant rate during 1.5 hours and fed to the reactor through which nitrogen was flowing at the rate of 0.1 liter per minute. The calculated contact time was 6 seconds. Distillation of the product, which was collected in a receiver cooled to −80° C., yielded mixed butenes in 42% conversion.

*Example IV*

During a period of 2.1 hours, acetic acid (60 g. or 1.0 mole) and ammonia gas (2.1 mole) were fed simultaneously under atmospheric pressure and at constant rates into a reactor containing 100 ml. of zinc molybdite catalyst prepared as described in Example I. The temperature of the reactor was maintained at 405±20° C. and hydrogen flowing at 0.6 liter per minute was employed as a sweep gas. The calculated contact time was 4 seconds. The exit gases were collected in two traps, the first cooled at 0° C. and the second to −80° C. The combined product from both traps was in two layers. The upper layer was separated, dried, and distilled. Acetonitrile was obtained in 54% conversion.

*Example V*

A mixture of 75 g. of t-amyl alcohol and 2.5 g. of nickel molybdite catalyst, prepared by a method analogous to that described in Example I, was heated to reflux (B. P. 102° C.) under a fractionating column at atmospheric pressure. Distillate amounting to 15 g. was collected in the boiling range 35° to 42° C., $N_D^{25°\,C.}$ 1.3809. The distillate was dried over sodium sulfate and on redistillation the bulk of the material distilled at 34° to 37° C. The distilled product was characterized by infrared analysis to be a mixture of 2-methyl-1-butene and 2-methyl-2-butene.

In the foregoing examples certain preferred conditions of temperature, space velocity, contact time, catalyst volume, pressure, etc., have been used. It is to be understood, however, that these values can be varied within the scope of this invention without affecting its utility.

By the process of this invention any intramolecular or intermolecular dehydration can be effected advantageously.

Intramolecular dehydrations are reactions involving a molecule of one substance to form water as one of the products of reaction. Typical of such reactions are the formation of hydrocarbons from monohydric alcohols, the formation of cyclic ethers from polyhydric alcohols, the production of simple cyclic acid anhydrides from dicarboxylic acids, and the production of hydrocarbons from cyclic ethers.

Intermolecular dehydrations are reactions involving two or more reacting molecules to form water as one of the products of reaction. Exemplary of such reactions are the formation of acyclic ethers from alcohols, or open-chain anhydrides from monocarboxylic acids, formation of nitriles from carboxylic acid substances and ammonia, production of heterocyclic nitrogen compounds from ammonia or amines and either aldehydes or ketones, the production of amines from alcohols and either ammonia or primary or secondary amines, and the like.

Operable compounds for use in the process of this invention are those containing an oxy or oxo group as exemplified by alcohols, such as ethyl alcohol, propyl alcohol, octyl alcohol, dodecyl alcohol, octadecyl alcohol, and the like; ethylene glycol, butylene glycol, and the like; cyclohexanol, and the like; acids such as acetic acid, propionic acid, caproic acid, capric acid, dodecanoic acid, octadecanoic acid, and the like; maleic acid, phthalic acid, benzoic acid, cyclohexane carboxylic acid, toluic acid, naphthoic acid, and the like; ethers such as diethyl ether, dipropyl ether, propyl amyl ether, tetrahydrofurane, and the like; aldehydes and ketones such as paraldehyde, acetaldehyde, propionaldehyde, butyraldehyde, octanal-1, dodecanol-1, acetone, methyl ethyl ketone, diamyl ketone, hexyl decyl ketone, and the like.

The dehydration may be conducted with the oxy or oxo compound as sole reactants or it may be conducted in the presence of another material capable of reacting with the oxy or oxo compound with the elimination of water. Examples of such other reactant are ammonia, primary and secondary amines such as methyl amine, butyl amine, octyl amine, dodecyl amine, dibutyl amine, butyl decyl amine, dioctyl amine, didodecyl amine, and sulfhydryl compounds such as hydrogen sulfide or mercaptans and the like.

Broadly speaking the process of this invention is operable within the temperature range of from 50° to 500° C. It is preferred, however, to utilize temperatures in the range of 90° to 450° C. because within this more restricted temperature range the majority of the reactants utilized in the process of the invention are completely volatile.

The process of this invention is preferably practiced at ordinary pressures, although no disadvantages occur when it is operated at higher or lower pressures than atmospheric in order to increase the capacity of a given unit of apparatus or to facilitate vaporization of high boiling reactants.

In continuous operation, the contact time, which is the time in seconds required by the reactants to traverse the entire volume of the catalyst space at the temperature and pressure employed, is an important variable. The time of contact is not only dependent on the temperature and pressure but also on the catalyst volume and feed rate. In the practice of this invention these important interdependent variables are adjusted so that the contact time is within the range of 1 to 100 seconds and preferably within from 2 to 50 seconds.

The catalysts used in the practice of this invention are the metal molybdites disclosed and claimed in our copending application, Serial No. 111,982 filed August 23, 1949, of which the present application is a continuation-in-part. These molybdites exist in two series, in the first of which the molybdenum is present in the quadrivalent state corresponding to the oxide $MoO_2$ and the hypothetical acid $H_2MoO_3$, while in the second series the molybdenum exists in the bivalent state corresponding to the oxide MoO and the hypothetical acid $H_2MoO_2$. These molybdites may contain promoters or modifiers, such as iron, cadmium, barium, chromium, thorium, cobalt, copper, and the like, if desired. Preferred molybdites because of their high degree of activity are zinc molybdite having the formula $ZnMoO_3$, nickel molybydite having the formula $NiMoO_2$, cobalt molybdite having formulas corresponding to $CoMoO_2$ and $CoMoO_3$, manganese molybdite and copper molybdite having the formula $CuMoO_3$. These molybdites are preferably used in the form of pellets in stationary-bed continuous-flow reactors in order to minimize mechanical losses of catalyst. In moving-bed continuous-flow reactors or in refluxing liquids, the catalyst is more advantageously employed in finely divided form.

The amount of catalyst employed in a specific operation depends upon such interdependent variables as temperature, contact time, pressure, particular catalyst, and the like. As a rule, in continuous operation the quantity of catalyst employed should be adjusted to yield a contact time of 1 to 25 seconds. In batch operation at least 0.01% by weight of catalyst, based on the weight of the material being processed, is employed. The use of amounts in excess of 25% of catalyst, based on the weight of the material or materials being processed, has no practical advantage and this value therefore represents the economic upper limit of catalyst ratio.

When the activity of the catalyst decreases or disappears through prolonged use, it may be restored by oxidizing the spent molybdite in air or oxygen at temperatures up to 500° C. and then reducing the resulting molybdate back to molybdite by the procedure illustrated in Example I.

The use of an added reaction medium is not essential but its employment is sometimes desirable to aid in the dissipation of the heat of reaction. As reaction media for vapor-phase operations, there may be used inert gases such as nitrogen or normally liquid, volatile, organic solvents, such as isooctane, cyclohexane, and benzene. In liquid phase operations hydrocarbons, such as benzene, xylenes or mineral oils can be employed as reaction media.

The process of this invention is advantageous over the use of chemical dehydrating agents because no auxiliary chemicals are employed. This is especially desirable from the economic standpoint. Moreover, the process does not involve the handling of corrosive dehydrating agents such as phosphorus pentachloride, sulfuric acid, and the like.

The process is particularly useful for synthesizing nitriles from amides or ammonium salts, or from ammonia and carboxylic acids. In such syntheses the amount of undesirable by-products is very small and purification problems are therefore reduced to a minimum. In the preparation of nitriles it is best to use the acid and ammonia as the raw materials. In practice it is desirable to operate in an atmosphere of ammonia and thus minimize the formation of tarry products and other undesired materials. Convenient ammonia: acid ratios are between 2:1 and 15:1. Nitriles which are advantageously prepared by the process of this invention are those of acetic, capric, lauric, myristic, palmitic, oleic, linoleic, adipic, sebacic, phthalic, and benzoic acids.

Amines can be prepared in good yields by the direct amination of alcohols. In such aminations the molecular ratio of alcohol:ammonia is the important variable influencing yield and proportion of primary, secondary, and tertiary amines in the product. At low alcohol:ammonia ratios, e. g., 1:4 primary amine is the principal product while at a ratio of 3:1 primary amine essentially disappears, the products consisting primarily of secondary and tertiary amines, the latter being formed in the largest amount.

Heterocyclic nitrogen compounds can be advantageously prepared by the process of this invention. Thus, picolines and collidines can be advantageously made from ammonia and either aldehydes or ketones.

The cleavage of tetrahydrofuran to butadiene can be readily effected and for this reaction the process is highly useful.

As many apparently widely different embodiments of this invention may be made without departing from the spirit and scope thereof, it is to be understood that this invention is not limited to the specific embodiments thereof except as defined in the appended claims.

We claim:

1. In a process for catalytically abstracting water from organic compounds capable of undergoing dehydration, the improvement which comprises contacting an organic compound capable of undergoing dehydration and selected from the class consisting of organic compounds containing an oxo group, organic compounds containing an oxy group and organic compounds containing a carboxylic acid group, at a temperature of 50° to 500° C. with a molybdite of a metal whose ions are soluble in aqueous ammonia in amount greater than that stoichiometrically required to precipitate the metal ion, said metal molybdite being a metal salt of an acid having one of the formulas corresponding to $H_2MoO_2$ and $H_2MoO_3$.

2. In a process as set forth in claim 1 wherein said metal molybdite is zinc molybdite having the formula $ZnMoO_3$.

3. In a process as set forth in claim 1 wherein said metal molybdite is nickel molybdite having the formula $NiMoO_2$.

4. In a process as set forth in claim 1 wherein said organic compound is vaporized and said metal molybdite is contacted with the vaporized organic compound at a temperature of 90° to 450° C.

5. In a process as set forth in claim 1 wherein said metal molybdite is contacted with said organic compound in liquid phase at a temperature of 90° to 450° C.

6. In a process for the dehydration of an alcohol capable of undergoing dehydration, the improvement which comprises contacting said alcohol at a temperature of 50° to 500° C. with a molybdite of a metal whose ions are soluble in aqueous ammonia in amount greater than that stoichiometrically required to precipitate the metal ion, said metal molybdite being a metal salt of an acid having one of the formulas corresponding to $H_2MoO_2$ and $H_2MoO_3$.

7. In a process for the dehydration of an alkanol to an alkene, the improvement which comprises contacting said alkanol at a temperature of 90° to 450° C. with zinc molybdite having the formula $ZnMoO_3$.

8. In a process for the dehydration of an alkanol to an alkene, the improvement which comprises contacting said alkanol at a temperature of 90° to 450° C. with nickel molybdite having the formula $NiMoO_2$.

9. In a process for the dehydration of a carboxylic acid and ammonia to form the nitrile of said acid, the improvement which comprises contacting said carboxylic acid and ammonia at a temperature of 50° to 500° C. with a molybdite of a metal whose ions are soluble in aqueous ammonia in amount greater than that stoichiometrically required to precipitate the metal ion, said metal molybdite being a metal salt of an acid having one of the formulas corresponding to $H_2MoO_2$ and $H_2MoO_3$.

10. In a process for the dehydration of a carboxylic acid and ammonia to form the nitrile of said acid, the improvement which comprises contacting said carboxylic acid and ammonia at a temperature of 90° to 450° C. with zinc molybdite having the formula $ZnMoO_3$.

11. In a process for the dehydration of a carboxylic acid and ammonia to form the nitrile of said acid, the improvement which comprises contacting said carboxylic acid and ammonia at a temperature of 90° to 450° C. with nickel molybdite having the formula $NiMoO_2$.

12. In a process for the dehydration of acetic acid and ammonia to form acetonitrile, the improvement which comprises contacting said acetic acid and ammonia at a temperature of 90° to 450° C. with zinc molybdite having the formula $ZnMoO_3$.

13. In a process for the dehydration of acetic acid and ammonia to form acetonitrile, the improvement which comprises contacting said acetic acid and ammonia at a temperature of 90° to 450° C. with a molybdite of a metal whose ions are soluble in aqueous ammonia in amount greater than that stoichiometrically required to precipitate the metal ion, said metal molybdite being a metal salt of an acid having one of the formulas corresponding to $H_2MoO_2$ and $H_2MoO_3$.

HERRICK R. ARNOLD.
JAMES E. CARNAHAN.

REFERENCES CITED

The following references are of record in the file of this patent:

UNITED STATES PATENTS

| Number | Name | Date |
|---|---|---|
| 2,077,421 | Lazier | Apr. 20, 1937 |
| 2,132,849 | Greenewalt et al. | Oct. 11, 1938 |
| 2,205,076 | Wortz | June 18, 1940 |
| 2,415,878 | Hale | Feb. 18, 1947 |